United States Patent [19]

Gunkel et al.

[11] 4,202,490

[45] May 13, 1980

[54] DRILL PIPE IDENTIFICATION METHOD AND SYSTEM

[75] Inventors: Walter A. Gunkel; Robert W. Lybecker, both of San Antonio, Tex.

[73] Assignee: Hughes Tool Company, Houston, Tex.

[21] Appl. No.: 918,640

[22] Filed: Jun. 23, 1978

Related U.S. Application Data

[63] Continuation of Ser. No. 756,164, Jan. 3, 1977, abandoned.

[51] Int. Cl.² ............ G06K 7/08; E21B 47/00; E21B 11/00
[52] U.S. Cl. .................... 235/449; 73/151; 175/40
[58] Field of Search ............ 235/449, 450; 360/1; 73/151.5, 151; 175/39, 40

[56] References Cited

U.S. PATENT DOCUMENTS

| | | | |
|---|---|---|---|
| 3,058,532 | 10/1962 | Alder | 175/39 |
| 3,117,445 | 1/1964 | Brown et al. | 73/151.5 |
| 3,233,647 | 2/1966 | Newell | 235/49.3 |
| 3,508,031 | 4/1970 | Cooper et al. | 235/450 |
| 3,774,445 | 11/1973 | Rundell et al. | 175/39 |
| 3,813,659 | 5/1974 | Charlton | 235/450 |

*Primary Examiner*—Daryl W. Cook
*Attorney, Agent, or Firm*—Robert A. Felsman

[57] ABSTRACT

Numbers in binary form comprising apertures filled with non-magnetic material are formed in the outer periphery of drill pipe sections for identification purposes. The numbers are read by a sensor and recorded as the drill pipe sections are lowered into a well bore in order to keep track of the position of the pipe sections in the drill string and to obtain a cumulative record of the service time of each drill pipe section for the purpose of determining fatigue damage. The sensor comprises an encircling electrical coil which generates a magnetic field in the walls of the drill pipe sections as they are moved through the coil and a second electrical coil which is rotated around the drill pipe section in the vicinity of the encircling coil for detecting the magnetic field next to the filled enclosing apertures of the identification numbers.

33 Claims, 10 Drawing Figures

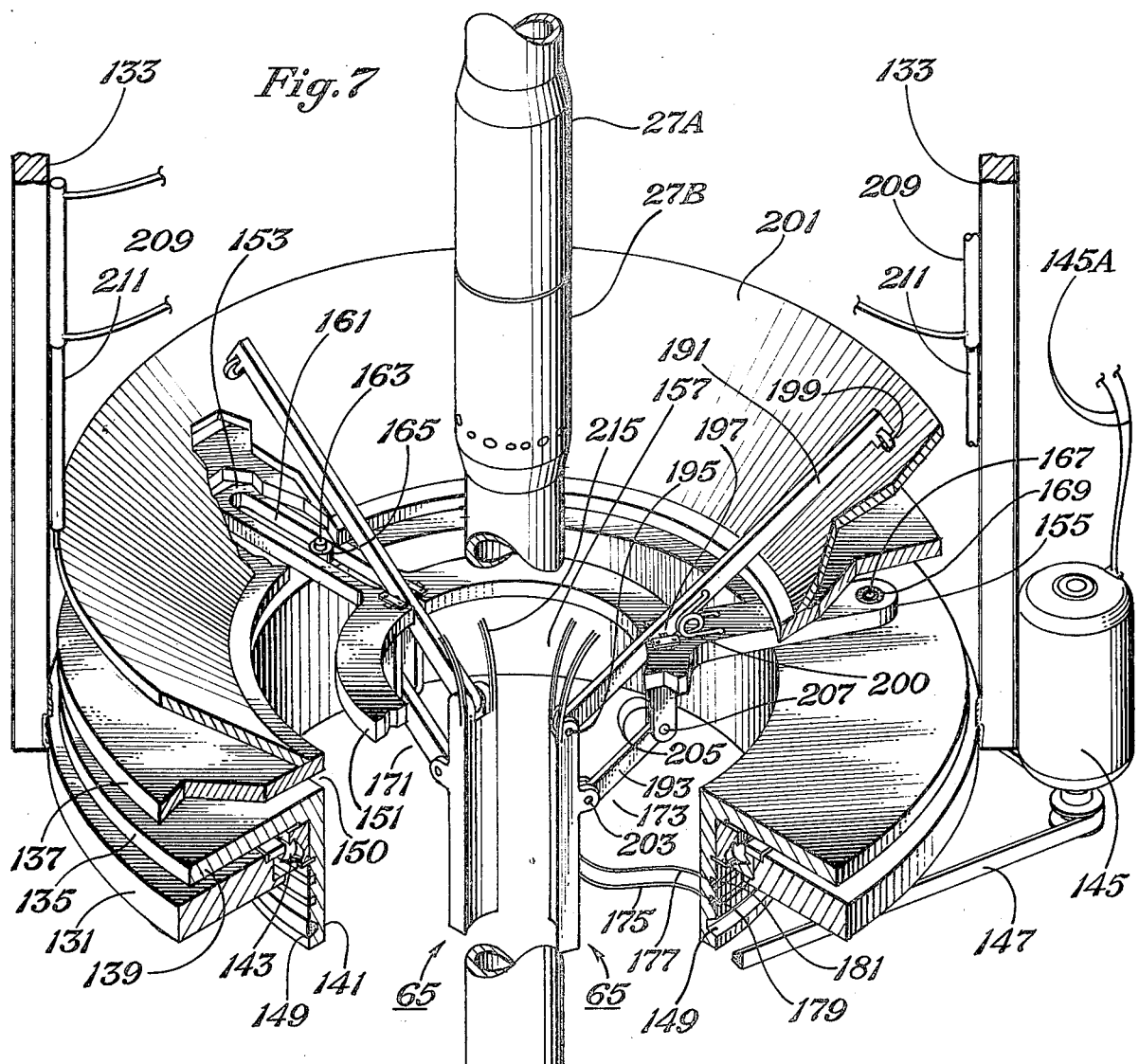
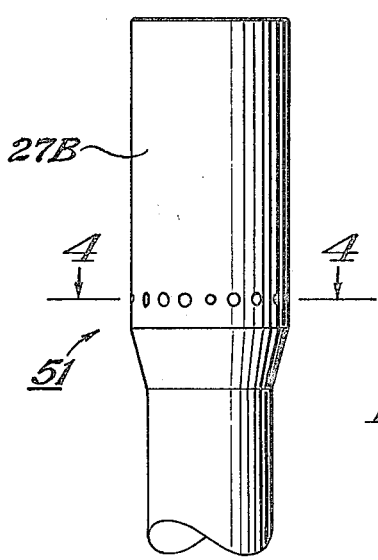
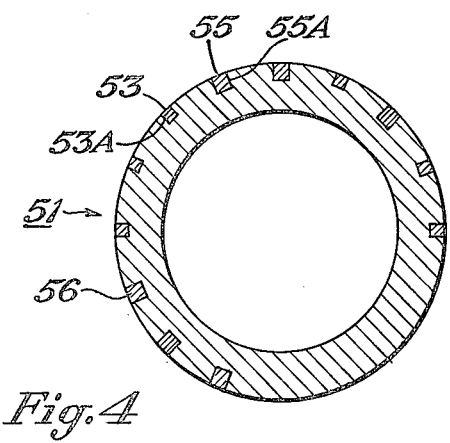

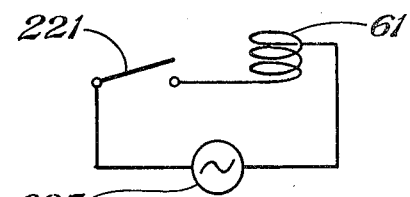
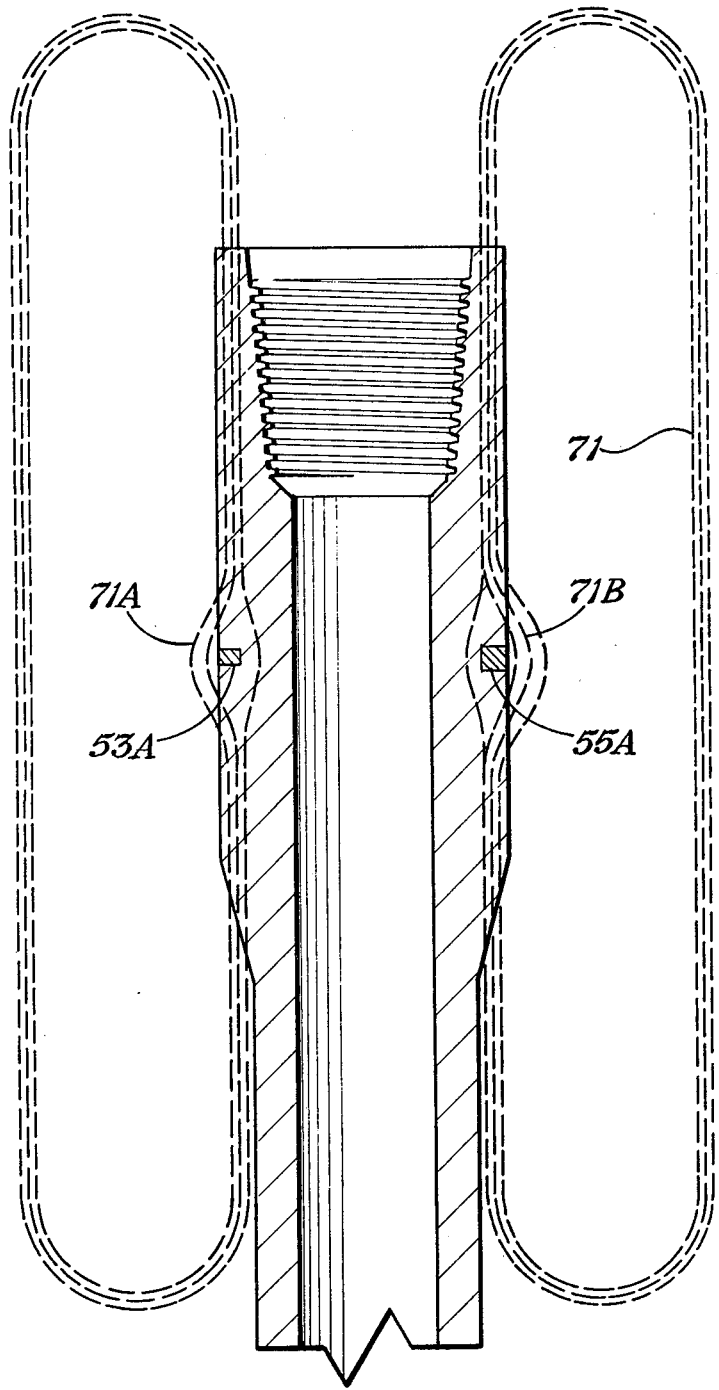
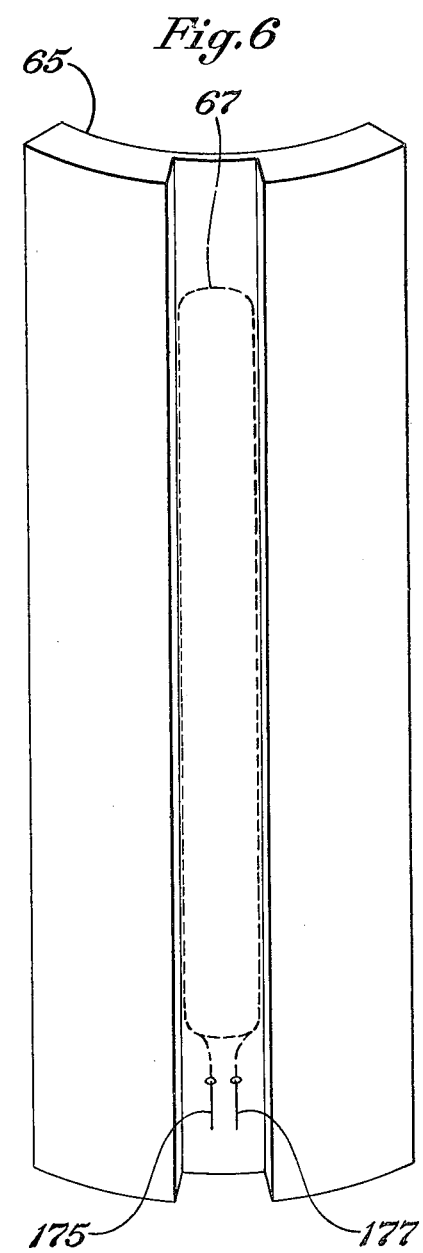

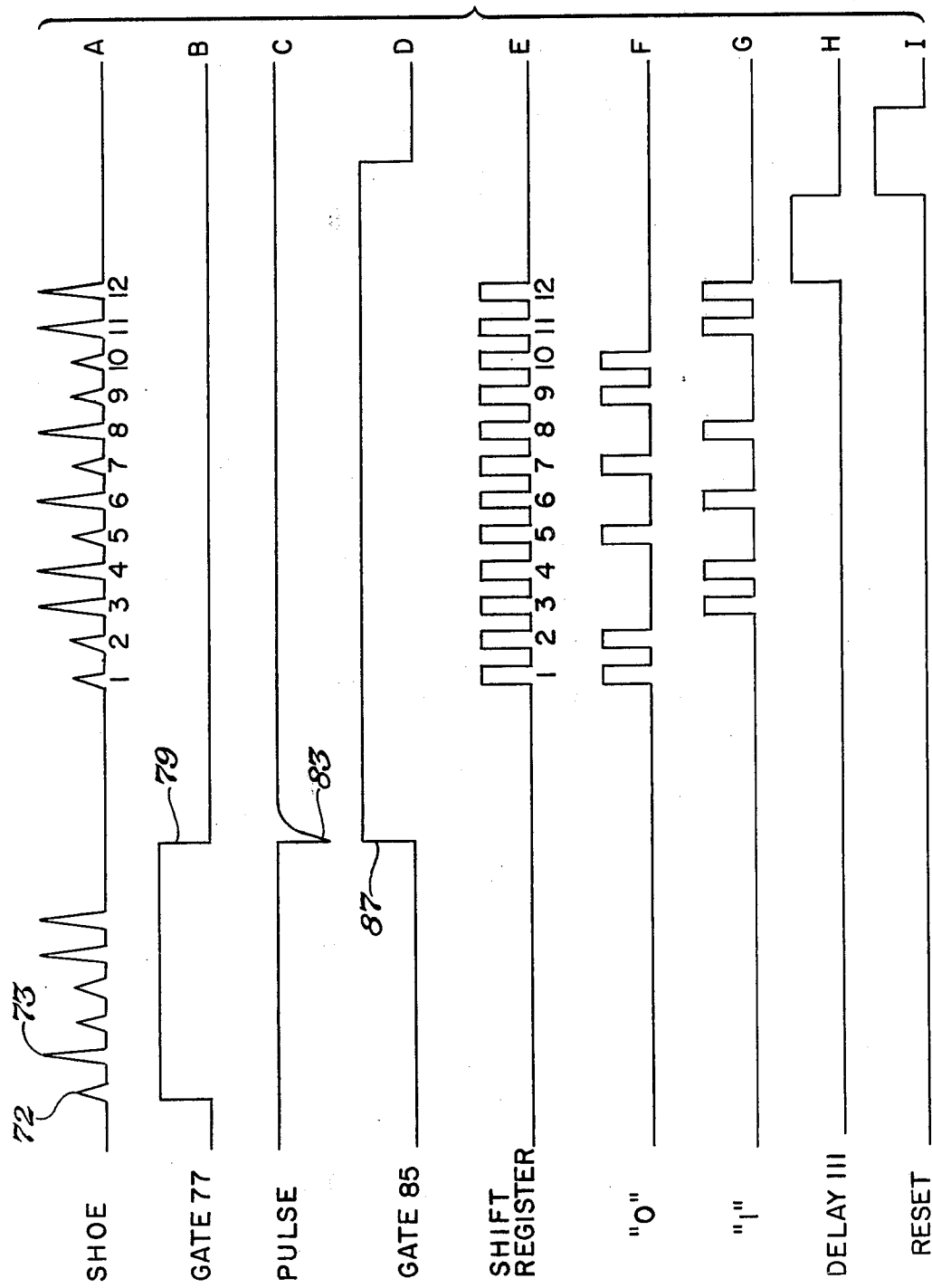

DRILL PIPE IDENTIFICATION METHOD AND SYSTEM

CROSS REFERENCE TO RELATED APPLICATIONS

This is a continuation of application Ser. No. 756,164, filed Jan. 3, 1977, now abandoned.

U.S. patent application, Ser. No. 756,215, entitled DRILL PIPE IDENTIFICATION SYSTEM, filed by Edward M. Galle on the same date as the present application, now abandoned.

U.S. patent application, Ser. No. 756,576, U.S. Pat. No. 4,061,967, issued Dec. 6, 1977, entitled SUPPORT SYSTEM FOR ROTATABLE DETECTING ELEMENT, filed by James R. Hall on the same data as the present application.

BACKGROUND OF THE INVENTION

1. Field of the Invention

This invention relates to the identification of drill pipe sections employed in a drill string of a borehole drilling system.

2. Description of the Prior Art

In borehole drilling operations, it is desirable to keep track of the position of the drill pipe sections in a drill string and to obtain a record of the service time of each drill pipe section for the purpose of determining fatigue damage. Such information is particularly useful by the contractor in determining the dollar value of the damage occuring to the pipe in drilling a given well and to determine when to downgrade or retire the pipe from service. It is possible to obtain and record this information manually, however, such a technique is time consuming and subject to error.

SUMMARY OF THE INVENTION

It is an object of the present invention to provide a method and system for rapidly and effectively identifying drill pipe sections of a drill string of a borehole drilling system.

It is a further object of the present invention to provide a method and system for detecting identification numbers encoded on drill pipe sections as they are raised or lowered by the drilling system.

The identification numbers formed on the drill pipe sections are capable of being detected with a detecting means comprising a magnetic field detector which is located next to the path of travel of the pipe sections. As the pipe sections are raised or lowered by the drilling system the detecting means is operated to detect the identification numbers of the drill pipe sections. The output of the detecting means is recorded to obtain a record of the sought after information.

In a further aspect, the identification numbers are symbols in binary form having a much lower magnetic permeability than the material of the walls of the drill pipe. In the embodiment disclosed, the symbols are spaced apart openings formed in the outer wall of each pipe section defining binary bits and which are filled with a relatively non-magnetic material. On each drill pipe section, the binary bits are located along a circle defined by the outer periphery of the drill pipe section. The detecting means comprises a first electrical coil having a central opening located to receive the drill pipe sections as they are moved along said path of travel and a second electrical coil adapted to be rotated around the drill pipe section in the vicinity of the first electrical coil. As each drill pipe section is moved through the opening of the first electrical coil, it is energized to generate a magnetic field for flow through the wall of the drill pipe section. In addition, the second electrical coil is rotated around the drill pipe section in the vicinity of the first electrical coil to detect the magnetic field as affected by said symbols in binary form. The output of the second electrical coil is recorded to obtain a record of each pipe section read.

BRIEF DESCRIPTION OF THE DRAWINGS

FIG. 3 is a side view of the end of the drill pipe shown in FIG. 2;

FIG. 4 is a cross-sectional view of FIG. 3 taken along the lines 4—4 thereof;

FIG. 5 is a cross-sectional view of the end of the drill pipe of FIG. 2 illustrating the magnetic field generated by the encircling electrical coil of the detecting system of FIG. 2;

FIG. 6 is an enlarged view of the detecting element of the detecting system of FIG. 2 which is rotated around the drill pipe sections in the vicinity of the encircling coil;

FIG. 7 illustrates a system for rotating the detecting element of FIG. 6;

FIG. 9 are timing diagrams useful in understanding the system of FIG. 8; and

FIG. 10 is an electrical schematic of a system for energizing the encircling electrical coil of FIG. 2.

DESCRIPTION OF THE PREFERRED EMBODIMENT

Figure 1:
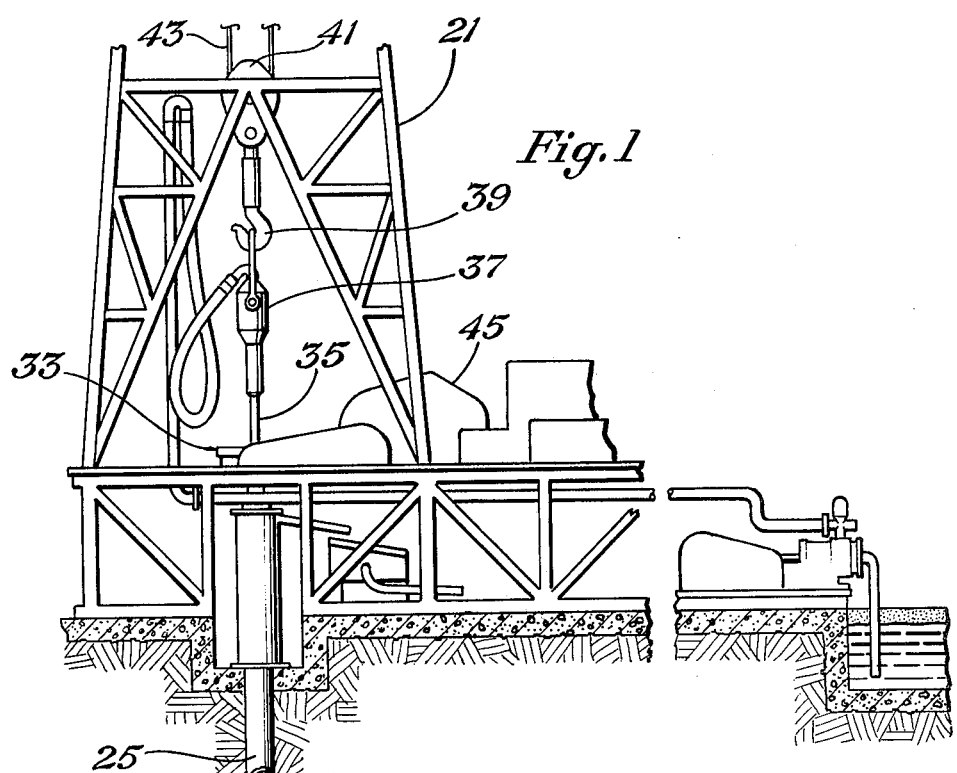
FIG. 1 illustrates a typical borehole drilling system in which the present invention may be employed.

Referring to FIG. 1, there is shown a conventional rotary drilling rig in which the method and system of the present invention may be employed. Reference numeral 21 designates a derrick located over a borehole 23 that contains surface casing 25, steel drill pipe sections 27 threaded together to form a drill string, and a drill bit 31.

The drill pipe sections 27 are threaded together with members commonly called "tool-joints". Such joints are formed by an externally threaded steel tubular member called a "pin" connected to one end of each pipe section and an internally threaded steel tubular member called a "box" connected to the opposite end of each pipe section. In the drawings, a pin connected to the lower end of a pipe section is identified at 27A and a box connected to the upper end of another pipe section is identified at 27B. These joint members may be connected to the ends of the pipe by welding or by threaded connections.

Rotation of the bit 31 is achieved by the engagement of a rotary table 33 with a kelly 35, which is the upper most tubular member of the drill string. The kelly 35 is attached to a swivel 37 which is supported in the derrick 21 by a hook 39, traveling block 41 and cable 43. The cable 43 is attached through pulleys at the top of the derrick (not shown) to the draw works 45, which lifts and lowers the drill string.

As indicated above, it is desirable to identify and maintain a record of each drill pipe section which is employed as part of the drill string. This is accomplished by encoding an identification number on each drill pipe section and reading the numbers as the drill pipe sections preferably are lowered into the borehole as part of the drill string in preparation for drilling operations. Preferably the numbers are encoded on the box member of each pipe section prior to the attachment of the box to the pipe.

Referring to FIGS. 2-4 and 7, the identification numbers are in binary form and comprise symbols 51 formed on the outer periphery of the box member 27B and hence of the drill pipe section 27. The symbols are of two sizes, a smaller size 53 which represents a "0" binary bit and a larger size 55 which represents a "1" binary bit. The bits are located along a circle defined by the outer periphery of the box member 27B and may comprise 12 bits to provide up to 4,095 different serial or identification numbers.

In forming the bits, 12 holes are drilled into the wall of the box member 27B from the outside in a given plane. The holes extend into the wall a short distance but do not extend through the wall. The 12 holes are equally spaced with respect to each other, except that the spacing between the 12th hole and the 1st hole is greater than the equi-distant spacing between all other holes. They are drilled selectively in one of two diameters, such as ¼ of an inch and ⅛ of an inch. The smaller diameter holes 53A represent a "0" binary bit and the larger diameter holes 55A represent a "1" binary bit. The holes are plugged or filled with a relatively non-magnetic material 56 having a wear resistance at least equal to that of steel and which preserves a smooth surface on the tool joint member 27B. The plugging material may be for example, stainless steel. Thus, the bits formed by the holes with their non-magnetic inserts have a much lower magnetic permeability than that of the steel walls of the drill pipe. Although 12 bits are disclosed, it is to be understood that more or less than 12 bits may be used to provide more or less than 4,095 different serial numbers.

Figure 2:
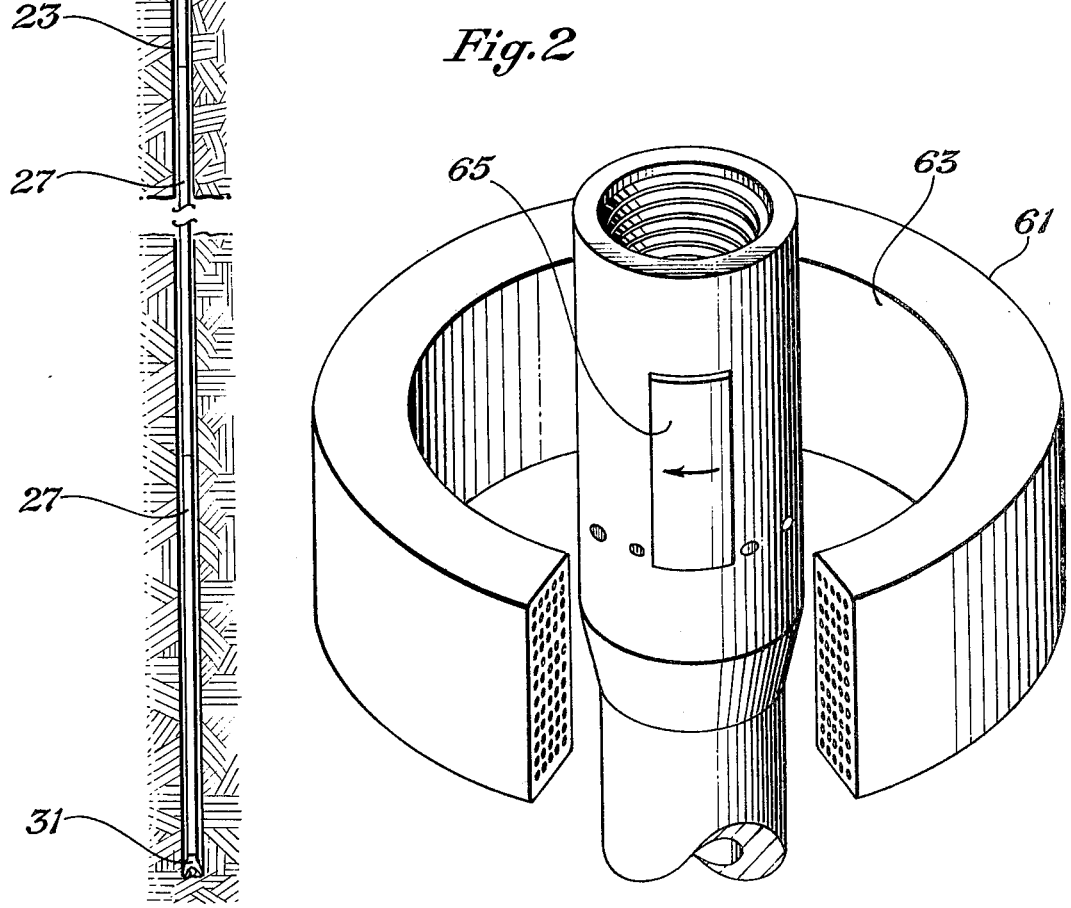
FIG. 2 illustrates an end of a drill pipe identified with a number in binary form and a detecting system comprising an encircling electrical coil and a rotating detecting element for detecting the identification number.

The binary serial number of each individual pipe section may be automatically read as the pipe enters (or leaves) the well by a detecting means or system shown in FIG. 2. This system comprises an electrical coil 61 having an enlarged central opening 63 positioned to receive the drill pipe sections as they are lowered into and raised from the borehole. Also provided is a detecting element 65 which includes a small electrical coil 67 (See FIG. 6) supported to rotate around and in contact with the pipe sections in the vicinity or within the opening 63 of the electrical coil 61. In operation, the electrical coil 61 is energized to generate a magnetic field as illustrated at 71 in FIG. 5. As a pipe section is moved through the coil 61, the magnetic field flows through the wall of the pipe section parallel to the longitudinal axis of the pipe and thus magnetizes the steel pipe. The resulting magnetic flux flows uniformly through the wall of the pipe section except in the area of the encoding holes where a leakage of flux occurs outside of the pipe section because the holes and inserts are non-magnetic and represent an interface to magnetic flux flow. A typical pattern of flux leakage around the holes 53A and 55A is shown at 71A and 71B in FIG. 5.

The shoe 65 is formed of a non-magnetic material such as brass and has the electrical coil 67 embedded therein. As the shoe 65 and hence the coil 67 is rotated in the opening of or within the vicinity of the electrical coil 61, it passes in sequence next to each binary hole as the pipe is moved through the coil 61 and a voltage pulse is induced into the coil 67 by virtue of the coil 67 passing through the magnetic leakage field about each hole. The small diameter holes, representing a "0" bit, induce a voltage pulse into the shoe coil 67 of a particular amplitude and the larger diameter holes, representing a "1" bit, induce a voltage pulse into the coil 67 approximately twice the amplitude of the small hole pulse. Thus, the shoe coil 67 has either a "0" or a "1" amplitude voltage induced into it for each of the holes. The voltage pulses generated thus represent the "0" bits and "1" bits defining a particular binary number encoded on each pipe section. These electrical signals may be removed from the electrical shoe coil 67 by conventional signal retrieval means such as slip rings or FM radio. After retrieval, the signals may be recorded directly on magnetic tape for subsequent analysis and processing. Preferably the signals are processed electronically at the wall site to provide a serial number read-out in the desired form. One such circuitry for processing and recording the signals is shown in block diagram in FIG. 8.

Figure 8:
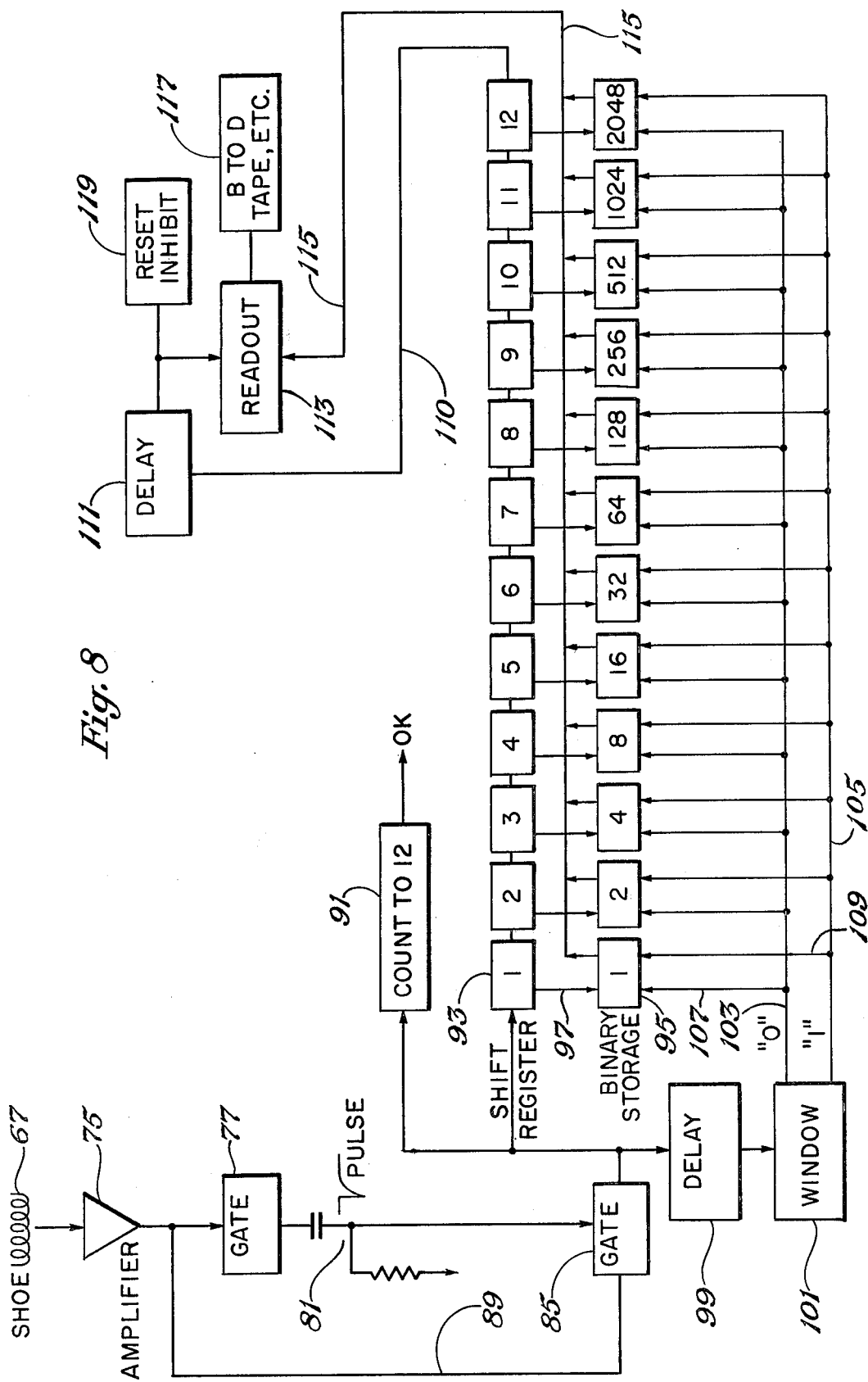
FIG. 8 is an electrical schematic of a system employed for processing and recording the output signals generated by the detecting element of FIG. 6.

Referring now to FIGS. 8 and 9, there will be described the circuitry shown for processing and recording the signals produced by the shoe coil 67. FIG. 9A represents the output of coil 67. The output pulses of the coil 67 occur in two amplitudes 72 and 73 representing "0" and "1" bits. In FIG. 9A, a train of signal pulses are shown at the beginning of the sequence diagram on the left as might occur if the shoe 65 initially comes into the encoded area between the sixth and seventh holes, for example. These six samples do not constitute the full binary count and therefore must be discarded. As seen in FIG. 8, the output of coil 67 is amplified by an amplifier 75. The output of the amplifier 75 actuates a gate 77 which is turned on by the first received pulse from coil 67 and has a time constant long enough to stay on until the next pulse, provided it occurs within the time spacing of the equally spaced holes. The output of the gate 77 is shown in FIG. 9B. After the last signal of the initial train of six signals (or whatever number of signals the initial train has) gate 77 turns off in the absence of an additional signal. A resulting pulse is produced by the gate having a trailing edge 79. The output of gate 77 is differentiated by circuitry 81 to generate a negative pulse when the gate 77 turns off. The negative pulse produced by the circuitry 81 is shown at 83 in FIG. 9C. This pulse turns on a gate 85 whose time constant is set to span the time interval of a full train of twelve pulses which is shown on the right in FIG. 9A. The purpose of this action is to insure that the full series of twelve binary bits are read in sequence. The positive voltage produced by gate 85 is shown at 87 in FIG. 9D. The output of amplifier 75 also is connected to the gate 85 by way of conductor 89. When gate 85 is turned on, it allows the amplified coil signals from amplifier 75 to pass through the gate to a count-to-twelve circuit which, upon counting to twelve and no more or less, activates a circuit to certify that a legitimate reading has occured. The certification circuit may include a light which is turned on for a certain period of time when the exact count-to-twelve has occured. In addition, the output signals from gate 85 drive a twelve-position shift register 93 and each position of the shift register, in sequence, turns on twelve stages of a binary storage system 95. In this respect, the first pulse from the train of twelve pulses from the shoe 67 turns on the first stage of the shift register 93. The second pulse of the train of twelve pulses from the shoe 67 turns the first stage off, which action turns on the second stage of the shift register 93. The third pulse from twelve pulses from the shoe 67 turns on the third stage of the shift register 93, etc. When a given stage of the shift register is on, the other stages will be off. The outputs of the stages of the shift register 93 are coupled to corresponding stages of the binary storage 95 by way of conductors 97. The output pulses from the twelve stages of the shift register 93 are shown in FIG. 9E.

The output signals from gate 85 also are applied to a delay circuit 99 which delays the signals later in time with respect to the shift register signals. The output of the delay circuit 99 is applied to a window 101 which is in effect a pulse height discriminator. The window 101 differentiates between the low amplitude and the high amplitude signals to generate "0" bit pulses in correct time sequence on conductor 103 and "1" bit signals in correct time sequence on the conductor 105. The signals on conductor 103 are illustrated in FIG. 9F while the signals on conductor 105 are illustrated in FIG. 9G. The time delay of these signals relative to the shift register signals is not illustrated in FIG. 9 because the amount of delay necessary is only about 10 percent of the shift register pulse width and could not be clearly shown in the Figure. The purpose of the time delay is to permit the shift register to fully turn on each binary stage before the application of 37 0" and "1" bit pulses, in order to be certain the bits are entered uniquely in the correct binary stage. As shown conductor 103 is connected to each stage of the binary storage 95 by way of conductors 107 and conductor 105 is connected to each stage of the binary storage by way of conductors 109. As each of the stages of the shift register 93 are sequentially turned on, each of the stages of the binary storage 95 are sequentially set whereby the binary bit signals on conductors 103 and 105 are appropriately stored in the proper stage of the binary storage 95. Thus, upon shifting to twelve of the shift register 93 the full binary sequence will be stored in the binary storage.

In addition, upon shifting to twelve, the shift register 93 generates a signal which is applied by way of conductor 110 through a delay circuit 111 to activate a read-out circuit 113. The outputs of the twelve stages of the binary storage 95 are connected to the read-out 113 by way of twelve conductors although for purposes of clarity a single conductor 115 is shown. The read-out circuit 113 thus reads the binary numbers stored in the twelve stages of the binary storage and applies them to an appropriate read-out or recording device 117. This device may comprise a binary-to-digital circuit and digital display; a binary-to-digital circuit which is coupled to a tape recorder; a tape recorder for recording the binary data directly on magnetic tape, etc. Simultaneously, the shift to twelve signal applied to delay circuit 111 activates a re-set and inhibit circuit 119 to re-set the shift register and the binary storage stages to zero and to inhibit additional signals from the same pipe section. The connection between the inhibit circuit 119 and the shift register 93 and binary storage 95 are not shown for purposes of clarity. The output of delay circuit 111 is shown in FIG. 9H and the output of circuit 119 is shown in FIG. 9I. Additional signals from the same pipe section may be inhibited by applying the output of the inhibit 119 to a circuitry which may be connected to the input of amplifier 75 or of gate 77 to prevent passage, for a predetermined time, of additional pulses from the coil 67 to the circuitry shown.

Circuitry for processing the signals before recording such as that shown in FIG. 8 is preferred since the data recorded is compatible with a computer which may be employed to calculate fatigue damage, cost and other information of the pipe sections. It is not necessary for a computer to be located on the rig, since the data recorded may be processed later through the computer. It is to be understood that circuit arrangements different from that shown in FIG. 8 may be employed to process and record the signals from the shoe coil 67.

Referring now to FIG. 7, there will be described the system for supporting the detecting shoe 65 and its electrical coil 61 for rotation around the drill pipe sections. The system of FIG. 7 comprises an annular support plate 131 which is fixed to the rig floor under the rotary table. The central opening of the annular support plate 131 is relatively large and is located to allow the pipe sections to pass through the opening when they are being raised from or lowered into the borehole. The support plate 131 is shown connected to two arms 133 which are in turn connected to the rig to properly locate the support plate. Plate 131 supports two plates 135 and 137 for rotation. Each of plates 135 and 137 is annular in shape and has a central opening slightly less than the opening of the support plate 131. Plate 135 has a horizontal portion 139 and a vertical portion 141 whereby the plate 135 is L-shaped in cross-section. Both of plates 135 and 137 are fixedly connected together (by means not shown) whereby plate 137 is spaced upwardly from plate 135. Bearings 143 support plate 135 and hence plate 137 for rotation relative to support plate 131. The plates are rotated by a motor 145, connected to one of the arms 133, and a belt 147 which fits into a groove 149 formed in the exterior of vertical portion 141 of plate 135.

A smaller diameter plate 151 is supported within the openings of plates 135 and 137. Inner plate 151 is supported by way of three radially extending arms located 120° apart. Only two arms 153 and 155 are shown. These arms ride in the space 150 between the plates 135 and 137 and hence support the plate 151 within the openings of the plates 135 and 137. Plate 151 is annular shaped and has a central opening 157 large enough to receive the drill pipe sections 27 as they are inserted into or removed from the well bore. The openings of plates 135 and 137 are large enough to allow the plate 151 to move laterally therein. Arm 153 has an elongated slot 161 formed therein. A pin 163 is fixedly attached between plates 135 and 137 and is fitted within the slot 161. A roller 165 surrounds the pin 163. Thus, as the outer plates 135 and 137 rotate, the pin 163 and roller 165 fitted within the slot 161 of arm 153 cause the arm 153 and hence the inner plate 151 to rotate with the outer plates as they are rotated by the motor 145 and belt 147. The pin 163 and roller 165 fitted within the slot 161 of the arm 153 also allow the inner plate 151 to translate and pivot about the pin 163 and hence move laterally within the openings of the outer plates 135 and 137 as they rotate. This arrangement allows the inner plate 151 to remain concentric with the drill stem or string as it moves through the opening 157 of the inner plate 151 and in the event that the drill string also moves laterally while moving downward or upward. A bearing 167 is fitted within an aperture 169 of the arm 155 for engagement with the upper surface of plate 135 to allow the arm 155 to move freely. A similar bearing is formed on the outer end of the third arm.

Pivotally attached to the inner plate 151 are three pairs of arms which support three shoes 65 for rotation around the drill pipe sections as they are moved through the opening 157 of inner plate 151. The three pairs of arms are located 120° apart. Only two pairs of arms 171 and 173 supporting two shoes 65 are shown. Three pairs of arms and three shoes are provided for balance purposes. One or two of the shoes may be dummy shoes with the third shoe having the detecting coil 67 embedded therein for reading the binary coded identification numbers on each of the pipe sections as described above. In the alternative, two or all three of the shoes may employ detecting coils 67 to obtain two or three records of the binary coded identification number of each pipe section for comparison purposes to insure accuracy of reading the identification numbers. In FIG. 7, the shoe on the left is a dummy shoe while the shoe on the right has the coil 67 embedded therein for reading the identification numbers. The two ends of the coil 67 are connected to conductors 175 and 177 which in turn are connected to slip rings 179 and 181 supported by the vertical portion 141 of the outer plate 135. Brushes, now shown, are employed to take the signals off of slip rings 179 and 181 and apply the signals by way of conductors to the recording system located on the rig.

Since both pairs of arms 171 and 173 are identical and operate in the same manner, only the pair of arms 173 will be described in detail. This pair of arms comprises an elongated arm 191 and a shorter arm 193. Arm 191 has its inner end pivotally connected to the top of the shoe 65 by way of a pivot pin 195. An intermediate portion of the arm 191 is pivotally connected to the inner plate 151 by way of a pivot pin 197. The outer end of the arm 191 has a roller 199 connected thereto and which is adapted to engage an outer beveled plate 201 which has a central opening which coincides with the central openings of plates 135 and 137. As shown the upper surface of plate 201 defines an inverted, hollow, truncated cone. Connected between the arm 191 and the arm 155 of the inner plate 151 is a spring 200 which urges the inner end of arm 191 upward and the outer end of arm 191 downward. The lower arm 193 has its inner end pivotally connected to the shoe 65 by way of a pivot pin 203 and its outer end pivotally connected to two support tabs 205 by way of a pivot pin 207. The tabs 205 are connected to the lower end of the inner plate 151. Two hydraulic cylinders 209, attached to arms 133, have their pistons 211 connected to opposite edges of the plate 201 to move the plate to an upper position or to a lower position.

While the identification numbers of the pipe sections are being read, the beveled plate 201 is located at its lower position where its upward surface is out of engagement with the rollers 199 to allow the pivoting arms 191 urged by the springs 200, to bring the shoes 65 into contact with the drill pipe as it is being lowered into the borehole. Plate 201 is moved to this lower position by proper actuation of cylinders 209. During reading operations plates 135 and 137 are rotated to rotate the inner plate 151 and its shoe support arms and hence the shoes 65 around the drill pipe. During drilling operations or when large or irregularly shaped pieces are lowered into the borehole, the shoes 65 are retracted to move them outward to allow sufficient space for drilling operations to take place or for large or irregularly shaped pieces to be lowered into the borehole. During this time, rotation of the shoes 65 is terminated. Retraction is accomplished by actuating the cylinders 209 to move the beveled plate 201 upward to engage the rollers 199 to move the outer ends of arms 191 upward which causes the inner ends of the arms 191 and hence the shoes 65 to be moved outward.

Attached to the upper ends of the shoes 65 are flexible guide members 215 for guiding the drill pipe sections through the shoe 65. Although not shown, small rollers may be attached to the inner surfaces of the shoes 65 to reduce their sliding contact with the drill pipe sections and thereby increasing their service life. The components including the inner plate 151 and the shoe supporting arms 191 and 193 may be formed of a non-magnetic material such as brass. The plates 135, 137 and 201 also may be formed of non-magnetic material.

The coil 61 may be supported in place by the support arms 133. It may be located below the plate 131 close to the shoes 65. The shoes 65 and their coils 67 are relatively long and may extend down into the opening of the coil 61 when the shoes 65 are in their reading positions.

Referring to FIG. 10, when it is desired to energize coil 61 for reading purposes, a switch illustrated at 221 will be closed to connect the coil with a source of voltage shown at 223. Although not shown a source of voltage will be connected to the leads 145A of the electric motor 145 with a control switch connected in one of the leads to turn the motor on or off.

In operation, for reading purposes, the cylinders 209 will be actuated to move the plate 201 to its lower position to allow the springs 200 to move the shoes inward against the drill pipe. As the drill pipe is moved through the opening 157 of plate 151, coil 61 will be energized and motor 145 actuated to rotate the shoes 65 around the drill pipe. In order to carry out drilling operations or to lower large pieces of equipment into the borehole, coil 61 will be de-energized and motor 145 stopped to terminate rotation of shoes 65. In addition, cylinders 209 will be actuated to move the plate 201 to its upward position to move the shoes 65 outward.

We claim:

1. A method of identifying drill pipe sections during the handling thereof by a drilling system employed for drilling a borehole into the earth formations, said drill pipe sections having formed thereon identification numbers capable of being detected with a detecting means comprising a magnetic field detector, said method comprising the steps of:

forming distinctive identifying numbers about the circumference of the selected drill pipe sections, said numbers having a magnetic permeability differing from that of the drill pipe section where the numbers are located, locating a detecting means comprising a magnetic field detector next to said drill pipe sections during the handling thereof by said drilling system, rotating said detecting means around the pipe, operating said detecting means to detect the numbers on said drill pipe sections, and recording the numbers detected.

2. The method of claim 1 wherein said identification numbers are symbols in binary form having a much lower magnetic permeability than the material of the walls of said drill pipe sections.

3. The method of claim 1 wherein said identification numbers are symbols in binary form located at spaced apart positions along a circle defined by the outer periphery of said drill pipe sections, said symbols have a much lower magnetic permeability than the material of the walls of said drill pipe sections, said detecting means comprises a first electrical coil having a central opening located to receive said drill pipe sections and a second electrical coil adapted to be rotated around the drill pipe section in the vicinity of said first electrical coil, said method comprising the steps of:

moving said drill pipe sections through the opening of said first electrical coil, and operating said detecting means by energizing said first electrical coil to generate a magnetic field for flow through the wall of the drill pipe section next to said first electrical coil and rotating said second electrical coil around said drill pipe section in the vicinity of said first electrical coil to detect said magnetic field as affected by said symbols in binary form.

4. A method of identifying drill pipe sections during the handling thereof by a borehole drilling system wherein said pipe sections are moved along a given path of travel, said drill pipe sections having formed thereon, about their circumferences, identification numbers capable of being detected with a detecting means comprising a magnetic field detector, said method comprising the steps of:

locating a detecting means comprising a magnetic field detector next to the said path of travel of said drill pipe sections;

as said drill pipe sections are moved along said path of travel by said drilling system, operating said detecting means to detect the numbers on said drill pipe sections;

rotating said detecting means about the pipe, and recording the numbers detected.

5. The method of claim 4 wherein said identification numbers are symbols in binary form having a much lower magnetic permeability than the material of the walls of said drill pipe sections.

6. The method of claim 4 wherein said identification numbers are symbols in binary form located at spaced apart positions along a circle defined by the outer periphery of said drill pipe sections, said symbols have a much lower magnetic permeability than the material of the walls of said drill pipe sections, said detecting means comprises a first electrical coil having a central opening located to receive said drill pipe sections as they are moved along said path of travel, and a second electrical coil adapted to be rotated around the drill pipe section in the vicinity of said first electrical coil, said method comprising the steps of:

moving said drill pipe sections through the opening of said first electrical coil, and operating said detecting means by energizing said first electrical coil to generate a magnetic field for flow through the wall of drill pipe section next to said first electrical coil and rotating said second electrical coil around said drill pipe section in the vicinity of said first electrical coil to detect said magnetic field next to said symbols in binary form.

7. The method of claim 4 wherein said identification numbers are symbols in binary form.

8. The method of claim 7 wherein said symbols are located at spaced apart positions along a circle defined by the outer periphery of said drill pipe sections, said detecting means comprises a first electrical coil having a central opening located to receive said drill pipe sections and a second electrical coil adapted to be rotated around the drill pipe section in the vicinity of said first electrical coil, said method comprising the steps of:

moving said drill pipe sections through the opening of said first electrical coil, and operating said detecting means by energizing said first electrical coil to generate a magnetic field for flow through the wall of the drill pipe section next to said first electrical coil and rotating said second electrical coil around said drill pipe section in the vicinity of said first electrical coil to detect said magnetic field next to said symbols.

9. A method of identifying drill pipe sections during the handling thereof by a borehole drilling system wherein said pipe sections are moved along a generally vertical path of travel, said drill pipe sections having formed thereon, about their circumferences, identification numbers comprising openings formed in the outer walls of said drill pipe sections and which are filled with relatively non-magnetic material, said method comprising the steps of:

locating next to the said path of travel of said drill pipe sections, a detecting means capable of detecting said identification numbers;

as said drill pipe sections are moved along said path of travel by said drilling system, operating said detecting means to detect the numbers of said drill pipe sections;

rotating said detecting means about the pipe, and recording the numbers detected.

10. In a drilling system for drilling a borehole into the earth formations employing drill pipe sections, the combination therewith comprising:

identification means formed along the circumference on said drill pipe sections for identification purposes;

said identification means being capable of being detected by a detecting means comprising a magnetic field detector;

detecting means comprising a magnetic field detector located at said drilling system for detecting said identification means of said drill pipe sections; and rotation means to cause relative motion between said detection means and said drill pipe sections; and recording means for recording the identification symbols detected by said detecting means.

11. The combination of claim 10 comprising:

recording means for recording the output of said detecting means.

12. The combination of claim 11 wherein:

said identification means comprise symbols in binary form having a much lower magnetic permeability than the material of the walls of said drill pipe sections.

13. The system of claim 12 wherein:

said symbols are located at spaced apart positions along a circle defined by the outer periphery of said drill pipe sections, said detecting means comprises:

a first electrical coil having a central opening located to receive said drill pipe sections, means for energizing said first electrical coil to generate a magnetic field for flow through the wall of the drill pipe section next to said first electrical coil, and a second electrical coil adapted to be rotated around the drill pipe section in the vicinity of said first electrical coil to detect said magnetic field as affected by said symbols in binary form.

14. An identification system for identifying drill pipe sections employed by a borehole drilling system wherein said drill pipe sections are moved along a generally vertical path of travel, said drill pipe sections having formed thereon, about their circumferences, identification symbols capable of being detected with a detecting means comprising a magnetic field detector, said identification system comprising:
  detecting means comprising a magnetic field detector located next to said given path of travel of said drill pipe sections for detecting said identification symbols of said drill pipe sections as they are moved along said path of travel;
  rotating means for rotating said detecting means about said drill pipe sections; and
  recording means for recording the identification symbols detected by said detecting means.

15. The system of claim 14 wherein said identification symbols are in binary form and have a much lower magnetic permeability than the material of the walls of said drill pipe sections.

16. The system of claim 14 wherein:
  said symbols have a much lower magnetic permeability than the material of the walls of said drill pipe sections and are in binary form located at spaced apart positions along a circle defined by the outer periphery of said drill pipe sections,
  said detecting means comprising:
    a first electrical coil having a central opening located to receive said drill pipe sections when moved along said path of travel,
    means for energizing said first electrical coil to generate a magnetic field for flow through the wall of drill pipe section next to said first electrical coil, and
    a second electrical coil adapted to be rotated around the drill pipe section in the vicinity of said first electrical coil to detect said magnetic field next to said symbols in binary form.

17. In a drilling system for drilling a borehole into the earth formations employing drill pipe sections and wherein said drill pipe sections are moved along a generally vertical path of travel, the combination therewith comprising:
  identification numbers formed on said drill pipe sections for identification purposes,
  said identification numbers comprise openings formed circumferentially in the outer walls of said drill pipe sections and which are filled with a relatively non-magnetic material,
  detecting means capable of detecting said identification numbers, located next to said path of travel for detecting said identification numbers as said drill pipe sections are moved along said path of travel,
  rotation means capable of causing relative rotational movement between said drill pipe sections and said detection means, and
  recording means for recording the identification numbers detected by said detecting means.

18. The combination of claim 17 wherein:
  said identification numbers are symbols in binary form.

19. The system of claim 18 wherein:
  said symbols are located at spaced apart positions along a circle defined by the outer periphery of said drill pipe sections,
  said detecting means comprises:
    a first electrical coil having a central opening located to receive said drill pipe sections,
    means for energizing said first electrical coil to generate a magnetic field for flow through the wall of the drill pipe section next to said first electrical coil, and
    a second electrical coil adapted to be rotated around the drill pipe section in the vicinity of said first electrical coil to detect said magnetic field next to said symbols.

20. A method of identifying drill pipe sections during the handling thereof by a borehole drill system wherein said pipe sections are moved along a given path of travel, said drill pipe sections having formed on the exterior walls thereof, about their circumferences, a plurality of spaced apart symbols for identification purposes, said symbols having a magnetic permeability much lower than that of the walls of said drill pipe sections, said method comprising:
  locating next to said path of travel of said drill pipe sections, a detecting means capable of detecting said symbols;
  rotating said detecting means around the pipe;
  as said drill pipe sections are moved along said path of travel by said drilling system, operating said detecting means to detect the symbols on said drill pipe sections; and
  recording the symbols detected.

21. In combination with an identification system on a tool joint connection member adapted to be attached to an end of a drill pipe of the type to be located in a borehole for carrying out drilling operations, comprising in combination with a detecting means, rotation means to rotate the detecting means about the tool and recording means to record signals from the detection means, the improvement with comprises:
  a plurality of symbols formed on the outer wall of said tool joint connection member defining a number for identification purposes,
  said symbols being located at spaced apart positions along a circle defined by the outer periphery of said tool joint connection member,
  said symbols being capable of being detected with a detecting means comprising a magnetic field detector.

22. The identification system of claim 21 wherein said symbols are in binary form.

23. An identification system on a tool joint connection member adapted to be attached to an end of a drill pipe of the type to be located in a borehole for carrying out drilling operations, comprising in combination with a detecting means, rotation means to rotate the detecting means about the tool and recording means to record signals from the detection means, the improvement which comprises:
  a plurality of symbols formed on the outer wall of said tool joint connection member defining a number for identification purposes,
  said symbols being located at spaced apart positions along a circle defined by the outer periphery of said tool joint connection member,
  said symbols having a magnetic permeability much lower than that of the wall of said tool joint connection member.

24. The identification system of claim 23 wherein said symbols are in binary form.

25. An identification system on a tool joint connection member adapted to be attached to an end of a drill pipe of the type to be located in a borehole for carrying out drilling operations, comprising in combination with a detecting means, rotation means to rotate the detecting means about the tool and recording means to record signals from the detection means, the improvement which comprises:
- a plurality of symbols formed on the outer wall of said tool joint connection member defining a number for identification purposes,
- said symbols being located at spaced apart positions along a circle defined by the outer periphery of said tool joint connection member,
- said openings being filled with a relatively nonmagnetic material.

26. The identification system of claim 25 wherein said openings are in binary form.

27. An identification system for a drill pipe of the type to be located in a borehole for carrying out drilling operations, comprising:
- a plurality of symbols formed on the outer wall of said drill pipe defining a number for identification purposes,
- said symbols being located at spaced apart positions along a circle defined by the outer periphery of said drill pipe,
- said symbols being capable of being detected with a detecting means comprising a magnetic field detector.

28. The identification system of claim 21 wherein said symbols are in binary form.

29. An identification system for a drill pipe of the type to be located in a borehole for carrying out drilling operations, comprising in combination with a detecting means, rotation means to rotate the detecting means about the tool and recording means to record signals from the detection means, the improvement which comprises:
- a plurality of symbols formed on the outer wall of said drill pipe defining a number for identification purposes,
- said symbols being located at spaced apart positions along a circle defined by the outer periphery of said drill pipe,
- said symbols having a magnetic permeability much lower than that of the wall of said drill pipe.

30. The identification system of claim 29 wherein said symbols are in binary form.

31. An identification system for a drill pipe of the type to be located in a borehole for carrying out drilling operations, comprising in combination with a detecting means, rotation means to rotate the detecting means about the tool and recording means to record signals from the detection means, the improvement which comprises:
- a plurality of openings formed in the outer wall of said drill pipe defining a number for identification purposes,
- said openings being located at spaced apart positions along a circle defined by the outer periphery of said drill pipe,
- said openings being filled with a relatively nonmagnetic material.

32. The identification system of claim 31 wherein said openings are in binary form.

33. An identification system on a tool joint connection member adapted to be attached to an end of a drill pipe of the type to be located in a borehole for carrying out drilling operations, comprising in combination with a detecting means, rotation means to rotate the detecting means about the tool and recording means to record signals from the detection means, the improvement which comprises:
- a plurality of symbols in binary form, formed on the outer wall of said tool joint connection member defining a number for identification purposes,
- said symbols being located at spaced apart position along a circle defined by the outer periphery of said tool joint connection member,
- said symbols being capable of being detected with a detecting means.

* * * * *

UNITED STATES PATENT OFFICE
CERTIFICATE OF CORRECTION

Patent No. 4,202,490        Dated May 13, 1980

Inventor(s) WALTER A. GUNKEL; ROBERT W. LYBECKER

It is certified that error appears in the above-identified patent and that said Letters Patent are hereby corrected as shown below:

Column 5, line 33, "37 0" " is changed to --- "0" ---.

Signed and Sealed this

Fourth Day of November 1980

[SEAL]

Attest:

Attesting Officer

SIDNEY A. DIAMOND

Commissioner of Patents and Trademark